United States Patent
Ito et al.

(10) Patent No.: US 12,405,212 B1
(45) Date of Patent: Sep. 2, 2025

(54) CALIBRATION METHOD OF MEASUREMENT TEMPERATURE OF CONCENTRATION MEASUREMENT APPARATUS, AND CONCENTRATION MEASUREMENT APPARATUS

(71) Applicant: AMANO Co., Ltd., Iwata (JP)

(72) Inventors: Shinobu Ito, Shizuoka (JP); Makoto Sagara, Tokyo (JP)

(73) Assignee: AMANO Co., Ltd., Shizuoka (JP)

( * ) Notice: Subject to any disclaimer, the term of this patent is extended or adjusted under 35 U.S.C. 154(b) by 0 days.

(21) Appl. No.: 18/993,787

(22) PCT Filed: Oct. 3, 2023

(86) PCT No.: PCT/JP2023/036056
§ 371 (c)(1),
(2) Date: Jan. 13, 2025

(87) PCT Pub. No.: WO2025/074505
PCT Pub. Date: Apr. 10, 2025

(51) Int. Cl.
*G01N 21/31* (2006.01)

(52) U.S. Cl.
CPC ....... *G01N 21/31* (2013.01); *G01N 2201/127* (2013.01)

(58) Field of Classification Search
CPC .......................... G01N 21/31; G01N 2201/127
See application file for complete search history.

(56) References Cited

U.S. PATENT DOCUMENTS

2006/0040401 A1    2/2006  Watabe et al.
2006/0292327 A1*  12/2006  Monden ................. G11B 7/246
(Continued)

FOREIGN PATENT DOCUMENTS

| JP | 2005-069969 A | 3/2005 |
| JP | 2008-256686 A | 10/2008 |
| JP | 2016217741 A * | 12/2016 |

OTHER PUBLICATIONS

Iwakiri, Ryuichi, et al. "Guidelines for standardizing cleansing and disinfection of gastrointestinal endoscopes." *Digestive Endoscopy* 31.5 (2019): 477-497.

(Continued)

*Primary Examiner* — Hina F Ayub
(74) *Attorney, Agent, or Firm* — FROST BROWN TODD LLP

(57) ABSTRACT

A concentration measurement apparatus includes a sample temperature sensor, optical sensors, an environmental temperature sensor, a storage unit storing second correlation information between first difference information between the environmental temperature and a temperature of a calibration sample, and second difference information between a theoretical temperature based on first correlation information between the temperature and a transmittance of the calibration sample with respect to a measurement value of the transmittance of the calibration sample measured by the concentration measurement apparatus 1 and the measurement value of the temperature of the calibration sample. The apparatus further includes a temperature calibration unit acquiring difference information between a temperature of a target sample and the environmental temperature, and calibrating the temperature measurement value of the measurement target sample by using calibration temperature information based on the second correlation information with respect to the difference information.

7 Claims, 10 Drawing Sheets

(56) References Cited

U.S. PATENT DOCUMENTS

2008/0246953 A1  10/2008  Chien et al.
2023/0296505 A1*  9/2023  Ichimura ............ G01N 21/3504
                                                    250/252.1
2024/0102923 A1*  3/2024  Young .................... G01N 21/78

OTHER PUBLICATIONS

International Search Report and Written Opinion dated Nov. 7, 2023, for International Application No. PCT/JP2023/036056, 6 pages.
Japanese First Office Action dated Sep. 17, 2024, for Application No. 2024-548713, 2 pages.
Japanese Notice of Allowance dated Nov. 12, 2024, for Application No. 2024-548713, 2 pages.

* cited by examiner (a)

(b)

(a)

(b)

(a)

(b)

CALIBRATION METHOD OF MEASUREMENT TEMPERATURE OF CONCENTRATION MEASUREMENT APPARATUS, AND CONCENTRATION MEASUREMENT APPARATUS

TECHNICAL FIELD

The present invention relates to a concentration measurement apparatus for performing, based on measurement of a temperature and transmittance or absorbance, concentration measurement on a sample having a correlation between a temperature, transmittance or absorbance, and concentration, or a calibration method of a measurement temperature of the concentration measurement apparatus.

BACKGROUND ART

At a medical site, a medical instrument used in operation and the like is cleaned, sterilized and reused, but in cleaning of an endoscope, for the safety of a patient, it is prescribed to clean the endoscope using a high-level disinfectant having a prescribed concentration after wiping off visible dirt (see "Guidelines for the Standardization of Cleaning and Sterilization of Digestive Endoscopes" published by the Japan Gastroenterological Endoscopy Society and the Japanese Association for Infectious Diseases).

The disinfectant used for cleaning is relatively expensive and thus is typically used repeatedly for a certain number of times or for a certain period of time. When the disinfectant is used, the concentration of the disinfectant is measured for confirmation that the disinfectant has a predetermined concentration.

Patent Document 1 discloses a technique related to an apparatus for measuring the concentration of such a disinfectant by absorptiometry.

CITATION LIST

Patent Literature

Patent Document 1: JP 2005-69969 A

SUMMARY OF INVENTION

Technical Problem

A disinfectant such as a glutaral aqueous solution or a phtharal aqueous solution has a correlation between a temperature, transmittance (or absorbance), and concentration. Thus, in order to measure the concentration based on the transmittance using absorptiometry, it is necessary to also measure the temperature (or it is necessary to perform measurement under a predetermined temperature condition).

Here, as described in Patent Document 1, the concentration measurement of the disinfectant in the concentration measurement apparatus using absorptiometry is performed on the disinfectant (sample) accommodated in an optical cell. However, it is not necessarily easy to accurately measure the temperature of the liquid in the cell.

In short, for example, a contact type temperature sensor such as a thermocouple is considered to be brought into direct contact with the disinfectant in the optical cell to measure the temperature. However, in the case of the contact type sensor, when there is a temperature difference between the disinfectant and the temperature sensor, there is a problem in that the temperature is affected by the heat capacity of the temperature sensor itself. The amount of the disinfectant in the optical cell is about several cc from the viewpoint of workability, not wasting the disinfectant, and the like, and the influence of the contact of the temperature sensor may not be negligible.

In order to solve such a problem, it is conceivable to use a non-contact type temperature sensor. However, when a radiation sensor, which is a non-contact sensor, is used, the radiation temperature from the wall surface of the optical cell is measured. Thus, when there is a temperature difference between the optical cell and the disinfectant, the liquid temperature of the disinfectant may not be accurately measured.

In the related art, in order to prevent or suppress these problems, concentration measurement (temperature measurement therefor) is performed after waiting for a state in which no temperature difference occurs between a disinfectant and a concentration measurement apparatus (such as an optical cell) (by allowing the disinfectant and the concentration measurement apparatus to stand under the environmental temperature to achieve thermal equilibrium).

However, such an operation is complicated, and there is a demand for measuring the concentration in a shorter time.

In view of the foregoing, an object of the present invention is to provide a concentration measurement apparatus (and a calibration method of a measurement temperature) for measuring a concentration of a sample by absorptiometry, which is capable of measuring a temperature relatively accurately in a short time.

Solution to Problem

Configuration 1

A calibration method of a measurement temperature of a concentration measurement apparatus performing, based on measurement of a temperature and a transmittance or an absorbance, concentration measurement on a sample having a correlation between a temperature, a transmittance or an absorbance, and a concentration, the calibration method including acquiring first correlation information between a temperature and a transmittance or an absorbance based on a sample having a known concentration, measuring, over time, values related to the temperature, the transmittance or the absorbance, and an environmental temperature of the sample having the known concentration by the concentration measurement apparatus, the concentration measurement apparatus including a sample temperature sensor, an optical sensor, and an environmental temperature sensor, acquiring second correlation information between first difference information and second difference information, the first difference information being information between a measurement value of the environmental temperature and a measurement value of the temperature of the sample, the second difference information being information between a theoretical temperature based on the first correlation information with respect to a measurement value of the transmittance or the absorbance and the measurement value of the temperature of the sample having the known concentration, in temperature measurement of a sample having an unknown concentration in concentration measurement of the sample, acquiring difference information between a measurement value of a temperature of the sample measured by the sample temperature sensor and a measurement value of an environmental temperature measured by the environmental temperature sensor, and acquiring calibration temperature information based on the second correlation information with respect to the difference information, and calibrating the measurement value of the temperature of the sample by using the calibration temperature information.

Configuration 2

The calibration method of the measurement temperature of the concentration measurement apparatus according to configuration 1, wherein the acquiring of the second correlation information includes acquiring positive second correlation information and negative second correlation information respectively in a manner corresponding to a positive and a negative of a difference between the measurement value of the environmental temperature and the measurement value of the temperature of the sample at a time of measuring the concentration of the sample having the known concentration, and the calibration method includes acquiring the calibration temperature information based on either the positive second correlation information or the negative second correlation information in accordance with whether the difference between the measurement value of the environmental temperature and the measurement value of the temperature of the sample at a time of measuring the sample having the unknown concentration is positive or negative.

Configuration 3

The calibration method of the measurement temperature of the concentration measurement apparatus according to configuration 1 or 2, the calibration method including determining an error when an absolute value of a difference between the measurement value of the environmental temperature and the measurement value of the temperature of the sample at a time of measuring the concentration of the sample having the unknown concentration is greater than an absolute value of a maximum value of a difference between the measurement value of the environmental temperature and the measurement value of the temperature of the sample at a time of measuring the sample having the known concentration.

Configuration 4

A concentration measurement apparatus performing, based on measurement of a temperature and a transmittance or an absorbance, concentration measurement on a sample having a correlation between a temperature, a transmittance or an absorbance, and a concentration, the concentration measurement apparatus including a sample temperature sensor configured to measure the temperature of the sample, an optical sensor configured to measure the transmittance or the absorbance of the sample, an environmental temperature sensor configured to measure an environmental temperature, a storage unit configured to store second correlation information between first difference information and second difference information, the first difference information being information between a measurement value of the environmental temperature and a measurement value of a temperature of a calibration sample measured by the concentration measurement apparatus, the second difference information being information between a theoretical temperature based on first correlation information between the temperature and a transmittance or an absorbance of the calibration sample with respect to a measurement value of the transmittance or the absorbance of the calibration sample measured by the concentration measurement apparatus and the measurement value of the temperature of the calibration sample, and a temperature calibration unit configured to acquire difference information between a measurement value of the temperature of the sample measured by the sample temperature sensor and a measurement value of the environmental temperature measured by the environmental temperature sensor, and calibrate the measurement value measured by the sample temperature sensor by using calibration temperature information based on the second correlation information with respect to the difference information.

Configuration 5

The concentration measurement apparatus according to configuration 4, wherein the second correlation information includes positive second correlation information and negative second correlation information corresponding to a positive and a negative of a difference between the measurement value of the environmental temperature and the measurement value of the temperature of the sample at a time of measuring a concentration of the calibration sample, and the calibration temperature information is acquired based on either the positive second correlation information or the negative second correlation information in accordance with whether the difference between the measurement value of the environmental temperature measured by the environmental temperature sensor and the measurement value of the temperature of the sample measured by the sample temperature sensor is positive or negative.

Configuration 6

The concentration measurement apparatus according to configuration 4 or 5, wherein error processing is performed when an absolute value of a difference between the measurement value of the environmental temperature measured by the environmental temperature sensor and the measurement value of the temperature of the sample measured by the sample temperature sensor exceeds a predetermined threshold.

Configuration 7

The concentration measurement apparatus according to configuration 4 or 5, wherein when an absolute value of a difference between the measurement value of the environmental temperature measured by the environmental temperature sensor and the measurement value of the temperature of the sample measured by the sample temperature sensor exceeds a predetermined threshold, processing of waiting until the absolute value becomes equal to or less than the threshold is performed.

Advantageous Effects of Invention

According to the present invention, it is possible to provide a concentration measurement apparatus (and a calibration method of a measurement temperature) for measuring a concentration of a sample by absorptiometry, which is capable of measuring a temperature relatively accurately in a short time.

DESCRIPTION OF EMBODIMENTS

Next, an embodiment of the present invention will be specifically described with reference to figures. Note that the embodiment described below is only a mode when the present invention is embodied, and the present invention is not limited to a scope of the embodiment.

Figure 1:
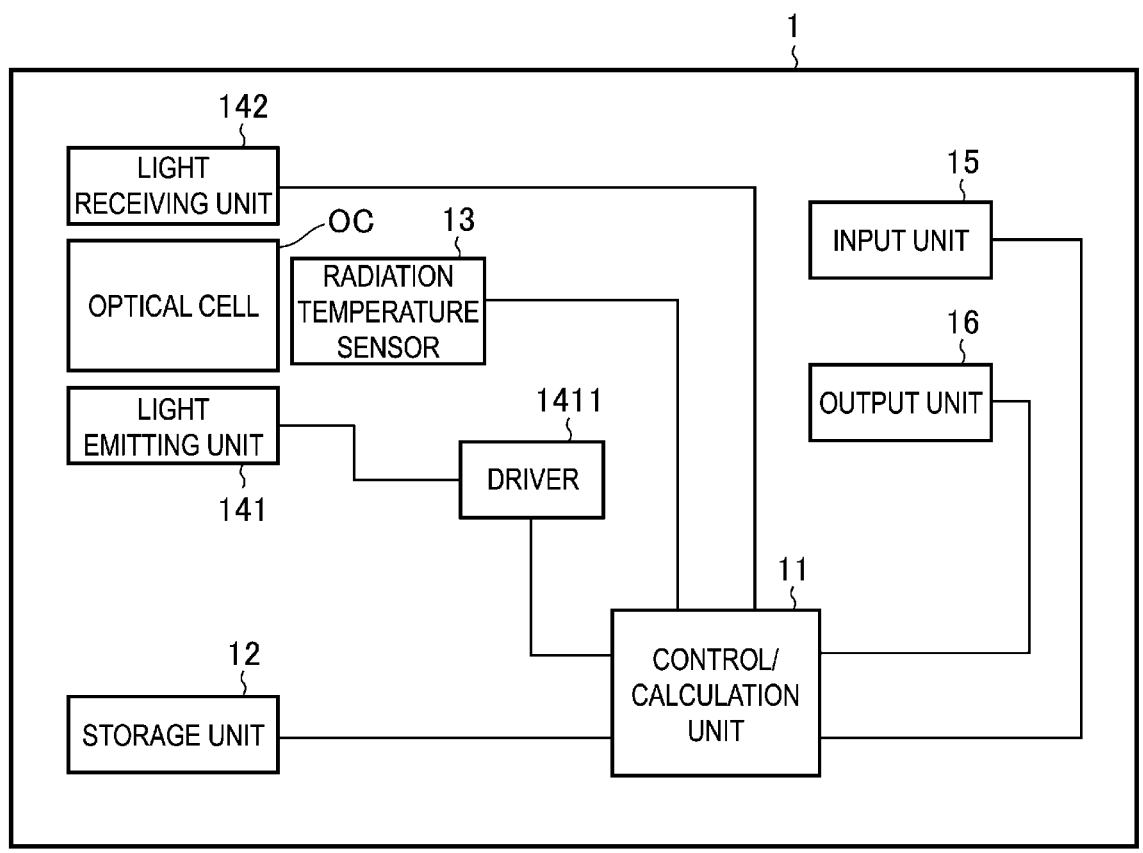
FIG. 1 is a block diagram illustrating a schematic configuration of a concentration measurement apparatus according to an embodiment of the present invention.

FIG. 1 is a block diagram illustrating a schematic configuration of a concentration measurement apparatus according to an embodiment of the present invention.

A concentration measurement apparatus 1 according to the present embodiment is a concentration measurement apparatus that performs, based on measurement of a temperature and transmittance or absorbance, concentration measurement on a disinfectant such as a glutaral aqueous solution or a phtharal aqueous solution having a correlation between a temperature, transmittance or absorbance, and concentration, the concentration measurement apparatus 1 including an optical cell OC containing the disinfectant, a radiation temperature sensor 13 functioning as both a sample temperature sensor for measuring the temperature of the disinfectant and an environmental temperature sensor for measuring an environmental temperature, a light emitting unit 141 and a light receiving unit 142 which are optical sensors for measuring the transmittance or absorbance of the disinfectant, a storage unit 12 for constantly or temporarily storing various data, programs, and the like necessary for an operation of the apparatus, an input unit 15 that includes an input means such as an operation button and serves as a user interface, an output unit 16 that includes an output means such as a display and an indicator and serves as a user interface, and a control/calculation unit 11 that controls each unit of the apparatus, performs various types of calculation processing, and also functions as a temperature calibration unit as described below.

With regard to the above expression "transmittance or absorbance", the absorbance is the logarithm of the reciprocal of the transmittance, and the difference between the transmittance and the absorbance does not make a conceptual difference in the application of the present invention (for example, in the case of handling the absorbance, conversion or the like based on the above relational expression may be performed). Thus, hereinafter, the "transmittance or absorbance" is simply referred to as "transmittance".

The optical cell OC is a container formed of a member that allows light emitted by the light emitting unit 141 to pass therethrough, and contains approximately several cc of the disinfectant.

The optical cell OC is attachable to and detachable from the concentration measurement apparatus 1 and is basically a single-use (disposable) member.

The radiation temperature sensor 13 is provided at a position facing a range where the disinfectant is contained of the optical cell OC attached to the concentration measurement apparatus 1, and measures the temperature of the sample (disinfectant) in a non-contact manner. The radiation temperature sensor is used to measure the liquid temperature of the disinfectant, and actually measures the surface temperature of the wall surface of the optical cell OC since the radiation temperature sensor measures the temperature based on infrared rays emitted from the surface of the optical cell OC. Thus, for example, when there is a temperature difference between the optical cell OC and the disinfectant due to a difference in environmental temperature between a place where the concentration measurement apparatus 1 and the optical cell OC are stored and a place where an endoscope cleaning apparatus containing the disinfectant is installed, the actual liquid temperature of the disinfectant may not be correctly measured. On the other hand, according to the concentration measurement apparatus 1 and a concentration measurement method (mainly a calibration method of a measurement temperature) of the present embodiment, the liquid temperature of the disinfectant can be measured more accurately by calibrating the measurement value of the radiation temperature sensor 13 as described below.

In the present embodiment, for example, a reference temperature sensor provided in the radiation temperature sensor 13 is used as the environmental temperature sensor, and thus, the radiation temperature sensor 13 has both functions of the sample temperature sensor and the environmental temperature sensor. Hereinafter, for convenience, the radiation temperature sensor 13 serving as the sample temperature sensor is referred to as a "sample temperature sensor 131", and the radiation temperature sensor 13 serving as the environmental temperature sensor is referred to as an "environmental temperature sensor 132".

The radiation temperature sensor 13 is connected to the control/calculation unit 11, and reading of a sensor value and the like are controlled by the control/calculation unit 11.

The light emitting unit 141 and the light receiving unit 142, which are optical sensors for measuring the transmittance of the disinfectant, are arranged such that the optical axis of the light emitting unit 141 passes through the disinfectant in the optical cell OC and the light receiving unit 142 can receive light that has passed through the disinfectant. Here, an example will be described in which the light emitting unit 141 is disposed facing one side surface of the optical cell OC and the light receiving unit 142 is disposed facing the opposite side surface, but the light emitting unit 141 and the light receiving unit 142 may be arranged in any manner as long as light that has passed through the disinfectant can be received.

The light emitting unit 141 is connected to the control/calculation unit 11 via a driver circuit 1411 for driving light emission, and the timing of light emission and the like are controlled by the control/calculation unit 11.

The light receiving unit 142 is also connected to the control/calculation unit 11, and the control/calculation unit 11 performs control of reading of a sensor value, calculation processing of the transmittance based on the sensor value, and the like.

As the input unit 15 and the output unit 16 which are user interfaces, any input interface such as a button, a touch panel, or a voice input unit, or any output interface such as a visual display apparatus such as an indicator or a display screen or an auditory output unit such as a speaker can be used.

Note that the input unit and the output unit are not limited to an interface for a user, and may be any input unit and any output unit for inputting/outputting information to/from another apparatus.

The storage unit 12 may be any storage apparatus capable of storing various data, programs, and the like necessary for the operation of the apparatus.

The storage unit 12 stores a program for executing processing described below and data necessary for executing temperature calibration processing described below. Such data includes "second correlation information between first difference information, which is a difference between the measurement value of the environmental temperature and the measurement value of the temperature of the calibration sample (disinfectant having a known concentration) measured by the concentration measurement apparatus 1, and second difference information, which is a difference between a theoretical temperature based on first correlation information between the temperature and the transmittance of the calibration sample with respect to the measurement value of the transmittance of the calibration sample measured by the concentration measurement apparatus 1, and the temperature of the calibration sample". This will be described in detail below.

The control/calculation unit 11 performs control of each unit of the apparatus and various types of calculation processing, and is configured using, for example, any semiconductor device such as a microcomputer in which a central processing unit (CPU) is mounted and which performs calculation processing.

The control/calculation unit 11 also functions as a temperature calibration unit for performing processing of "acquiring difference information between the measurement value of the temperature of the disinfectant measured by the sample temperature sensor 131 and the measurement value of the environmental temperature measured by the environmental temperature sensor 132, and calibrating the measurement value measured by the sample temperature sensor 131 by using calibration temperature information based on the second correlation information with respect to the difference information", which will be described below.

The control/calculation unit 11 also functions as a concentration calculation unit that calculates the concentration of the disinfectant based on the calibrated temperature information of the disinfectant and the transmittance information of the disinfectant.

Although not illustrated in the drawing, it is a matter of course that the control/calculation unit 11 is connected to each unit via an A/D conversion circuit, various filter circuits, and the like as necessary (a circuit for converting a signal into an appropriate signal as an input/output to/from the control/calculation unit 11 is appropriately provided).

In this example, the temperature calibration unit, the concentration calculation unit, and the like are implemented by software on a general-purpose device (configured by a program operating on the control/calculation unit 11). However, some or all of these units may be configured by hardware (for example, a dedicated IC).

Next, the concentration measurement method (mainly, the calibration method of the measurement temperature) of the present embodiment will be described with reference to FIG. 2 and the like.

Figure 2:
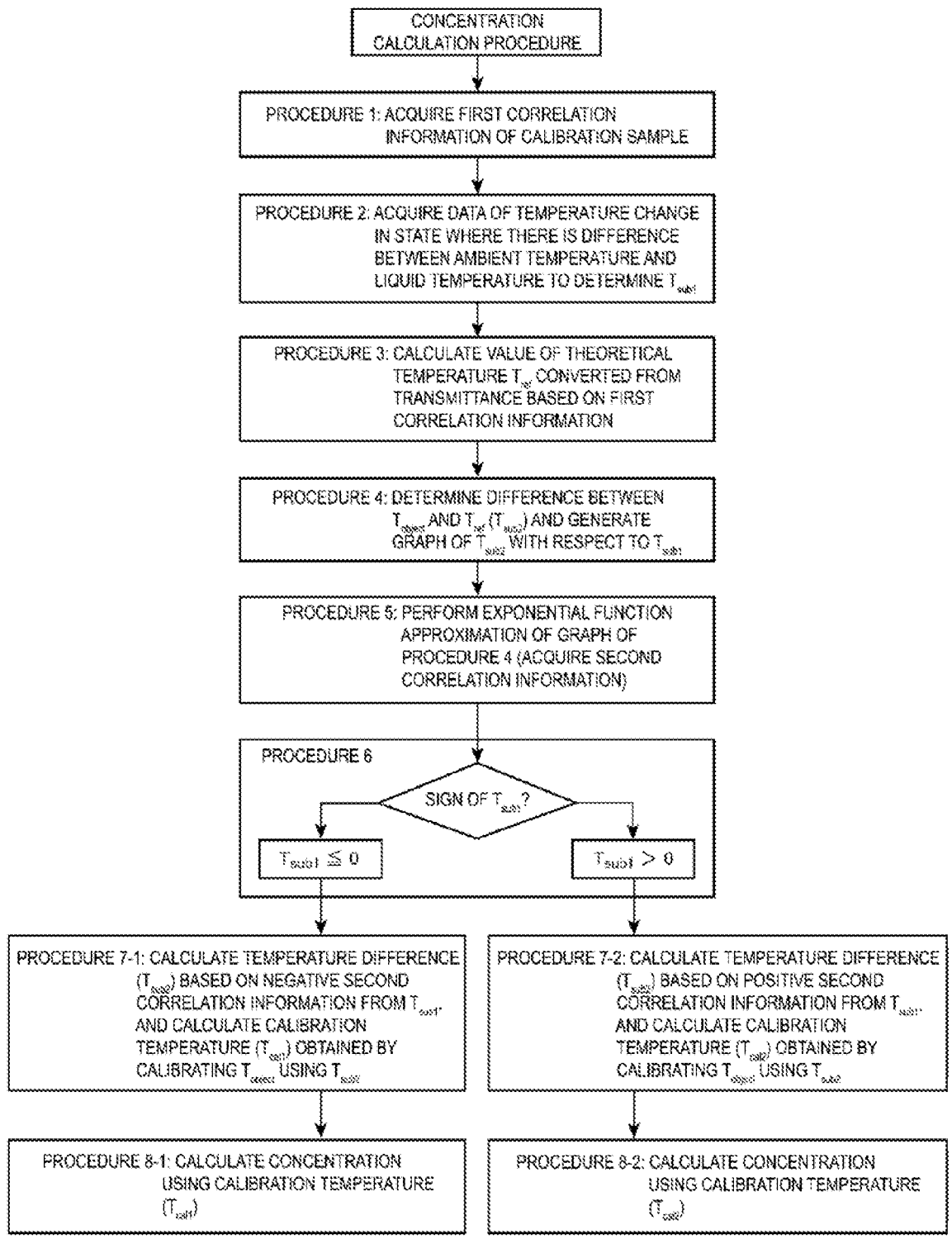
FIG. 2 is a flowchart illustrating an outline of a concentration measurement method (mainly a calibration method of a measurement temperature) according to the embodiment of the present invention.

FIG. 2 is a flowchart illustrating an outline of the concentration measurement method (mainly, the calibration method of the measurement temperature) of the present embodiment. Procedure 1 to Procedure 5 correspond to calibration processing (setting of parameters for temperature calibration) of the radiation temperature sensor 13 performed on each concentration measurement apparatus 1 in a manufacturing factory of the apparatus, and Procedure 6 to Procedure 8 correspond to processing of concentration measurement (calibration of the measurement temperature therefor) in the concentration measurement apparatus 1.

In Procedure 1, first correlation information between a temperature and a transmittance is acquired based on a disinfectant (calibration sample) having a known concentration.

Specifically, a plurality of disinfectants having different concentrations measured by high performance chromatography (HPLC) are prepared and held, for example, keeping the each disinfectants having different concentrations in a thermostatic bath for a certain period of time, and thereby the transmittance of each disinfectant is measured under constant temperature conditions such as 10, 15, 20, 25, 30, 35° C.

Figure 3:
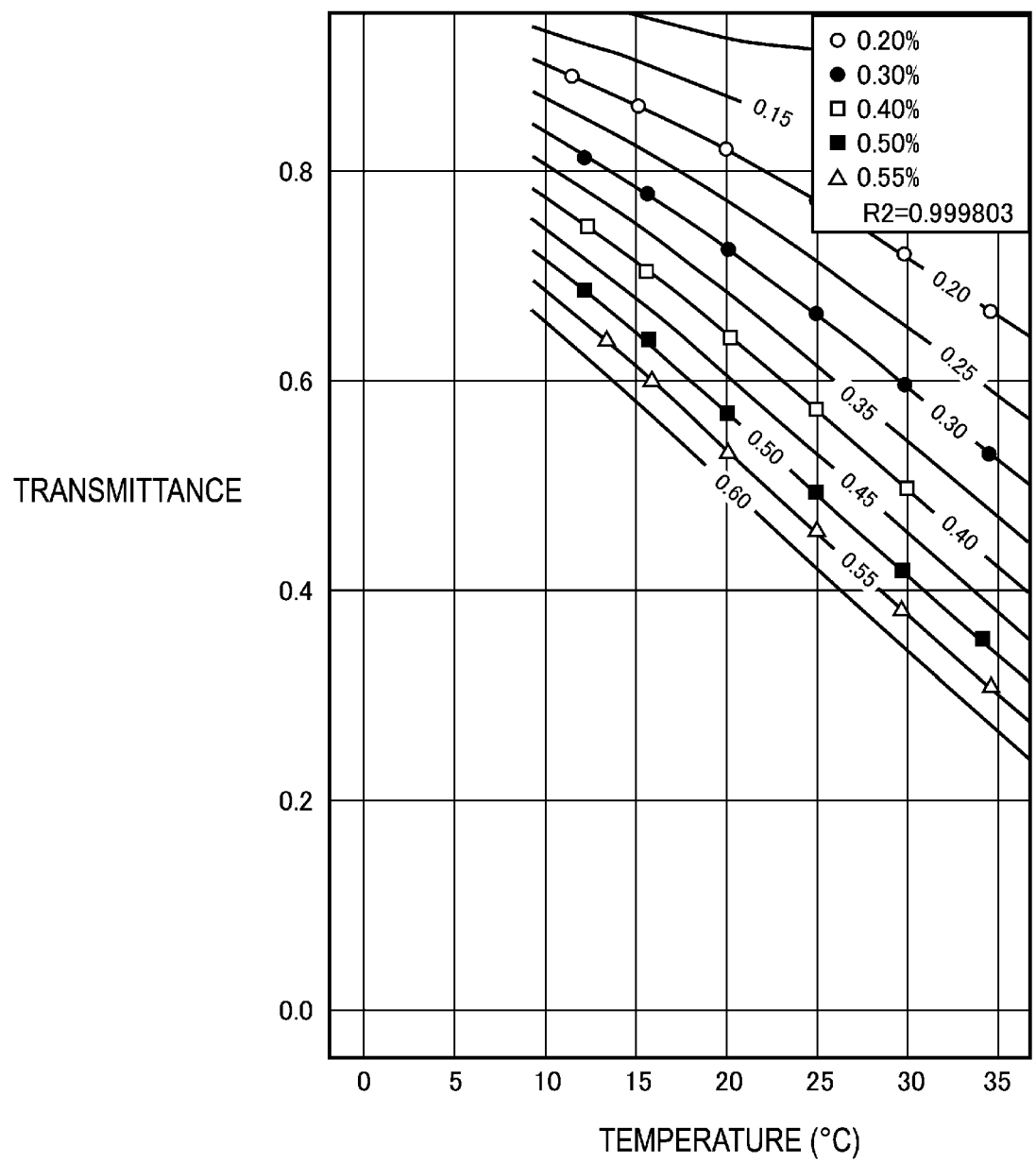
FIG. 3 is a graph illustrating an example of a correlation (first correlation information) between a temperature and transmittance created based on a disinfectant having a known concentration.

FIG. 3 illustrates an example in which the correlation between the temperature and the transmittance of each disinfectant (calibration sample) thus obtained is graphed. Note that the range of the concentration of the disinfectant to be measured may be determined based on the concentration at the time of actual use. Here, the measurement is performed in the range of 0.55 to 0.20% in view of the fact that the concentration of a target disinfectant (product) is 0.55% when the disinfectant is new and the use limit concentration is 0.3%.

Next, an approximate expression (a function of the concentration N, the temperature T, and the transmittance k) of the graph of FIG. 3 is determined.

The concentration N is calculated by following Equation 1 using the temperature T and the transmittance k.

$$N = iT^2k^2 + hTk^2 + gk^2 + fT^2k + eTk + dk + cT^2 + bT + a \quad \text{(Equation 1)}$$

Note that a to i are coefficients.

When A is $iT^2+hT+g$, B is $fT^2+eT+d$, and C is $cT^2+bT+a$ in following Equation 2 obtained by modifying Equation 1, a quadratic function of k (Equation 3) is obtained.

$$N = (iT^2 + hT + g)k^2 + (fT^2 + eT + d)k + (cT^2 + bT + a) \quad \text{(Equation 2)}$$

$$N = Ak^2 + Bk + C \quad \text{(Equation 3)}$$

In Equation 3, A, B, and C are each calculated by the least squares method, and the coefficients a to i are calculated by the least squares method from calculated A to C (the quadratic function of T).

This yields the coefficients of Equation 1 that approximates the graph of FIG. 3.

Note that any of the information in the state of the graph in FIG. 3 (or the information therefor) and the information as the approximate expression obtained based thereon corresponds to the "first correlation information".

The calculation processing of the "first correlation information" is performed on an information processing apparatus (an apparatus different from the concentration measurement apparatus 1) such as a PC having an application for calculating the above approximate expression, but may be configured to be executed on the concentration measurement apparatus 1.

In Procedure 2, the values of the temperature, the transmittance, and the environmental temperature of the calibration sample (the disinfectant having the known concentration) are measured over time using the concentration measurement apparatus 1, which is the calibration target.

More specifically, the concentration measurement apparatus 1 (optical cell OC) temperature-controlled at the environmental (ambient) temperature (for example, 15° C.) and a calibration sample temperature-controlled at a temperature (for example, 30° C.) different from the environmental temperature are prepared, and the temperature, transmittance, and environmental temperature of the calibration sample are acquired over time using the concentration measurement apparatus 1. Data of a progress in which the optical cells OC having different temperatures and the calibration samples put therein are thermally equilibrated is acquired. Note that the measurement over time is preferably performed until a state can be regarded as a thermal equilibrium state (a state in which there is no temperature difference between the environmental temperature and the liquid temperature).

Then, the first difference information $T_{sub1}$, which is the difference between the obtained measurement value of the environmental temperature and the obtained measurement value of the temperature of the calibration sample at each time point, is calculated (the calculation processing is performed by using an information processing apparatus such as a PC which is an external apparatus as described above, but may be performed by the concentration measurement apparatus 1).

The above-described processing of Procedure 2 is performed under the condition that the environmental temperature (the temperature of the concentration measurement apparatus 1 (optical cell OC)) and the temperature of the calibration sample are different as described above, and the high and low values of the temperatures are reversed (for example, the environmental temperature is set to 30° C. and the temperature of the calibration sample is set to 15° C. contrary to the above example). The environmental temperature and the temperature of the calibration sample may be set to be close to values having the maximum temperature difference that can be assumed under the actual use environment of the concentration measurement apparatus 1. Here, the following conditions are taken as examples: 1. the environmental temperature is 15° C. and the calibration sample temperature is 30° C. (FIG. 4A); and 2. the environmental temperature is 30° C. and the calibration sample temperature is 15° C. (FIG. 4B). Since a slight difference in the concentration of the disinfectant does not have a large influence on the behavior of thermal equilibrium, the concentration of the calibration sample for acquiring data on the progress of thermal equilibrium may be any concentration (for example, any concentration in the concentration range used in Procedure 1). In this case, the disinfectant having a use limit concentration of 0.3% is used.

Figure 4:
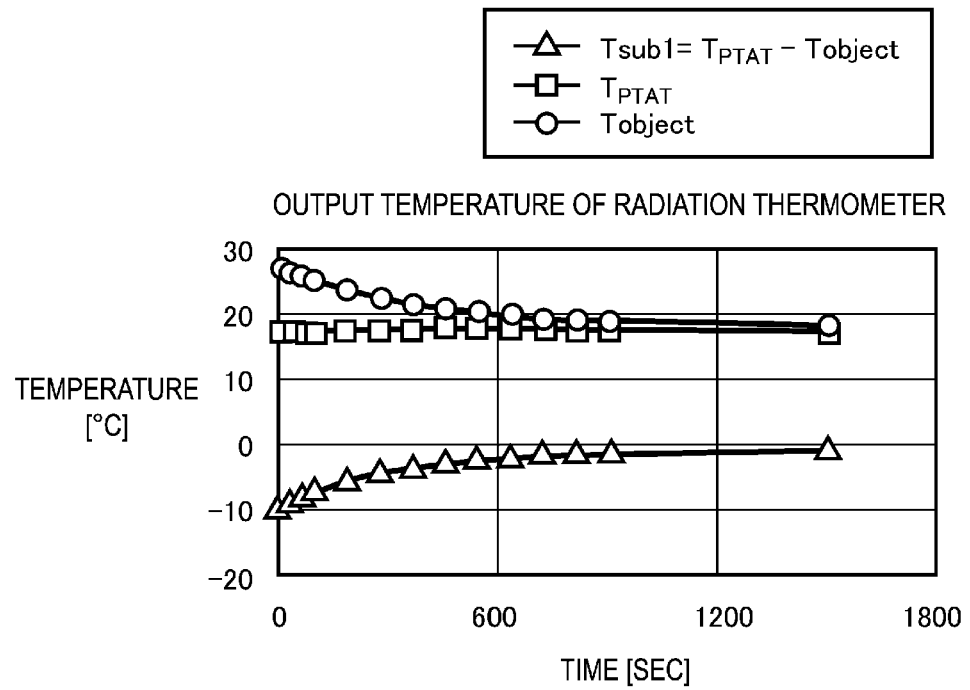
FIG. 4 is a figure illustrating an example in which the temperature of the disinfectant having the known concentration and an environmental temperature are measured over time by the concentration measurement apparatus, and $T_{sub1}$, which is a difference between these temperatures, is graphed.
Figure 4:
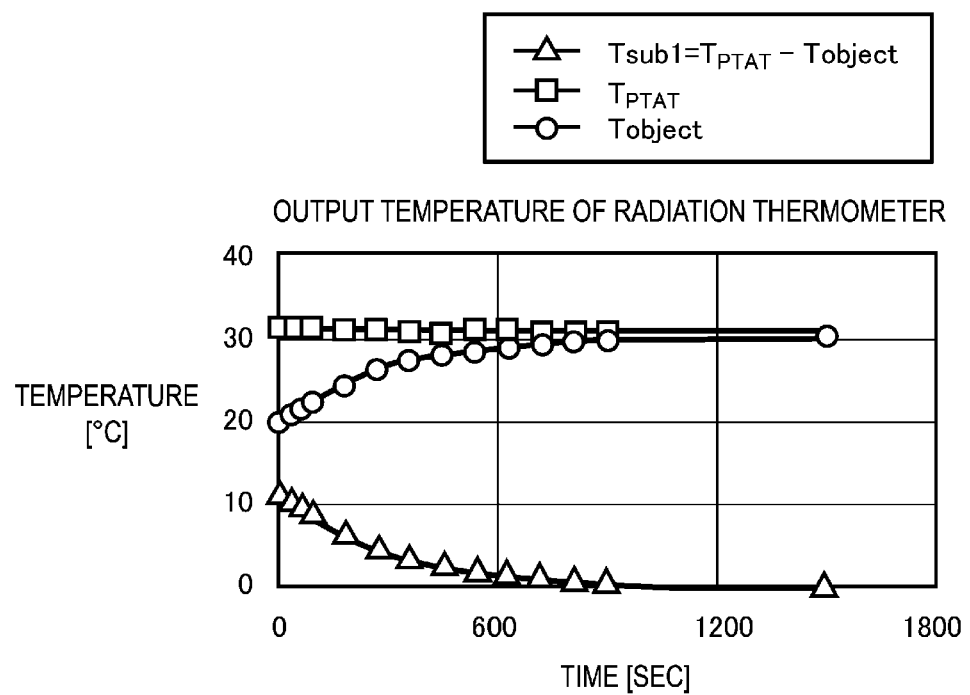

FIG. 4 illustrates an example of the data obtained in Procedure 2. $T_{object}$ is the temperature of the calibration sample acquired by the sample temperature sensor 131, $T_{PTAT}$ is the environmental temperature acquired by the environmental temperature sensor 132, and $T_{sub1}$ is the difference between these temperatures. FIG. 4A illustrates a case where the liquid temperature is higher than the environmental temperature, and FIG. 4B illustrates a case where the liquid temperature is lower than the environmental temperature.

Here, a case where $T_{sub1}$ is obtained by subtracting $T_{object}$ from $T_{PTAT}$ is taken as an example, but $T_{PTAT}$ may be subtracted from $T_{object}$ (in the processing described below, the sign may be reversed as necessary, and the difference in sign does not cause a conceptual difference).

In Procedure 3, processing of calculating the theoretical temperature based on the first correlation information with respect to the measurement value of the transmittance of the calibration sample measured over time using the concentration measurement apparatus 1 in Procedure 2 is performed.

That is, processing of calculating the temperature T (theoretical temperature $T_{ref}$) is performed using the concentration N (known) and the transmittance k (measurement value measured over time) of the calibration sample in Equation 1 which is the first correlation information.

Figure 5:
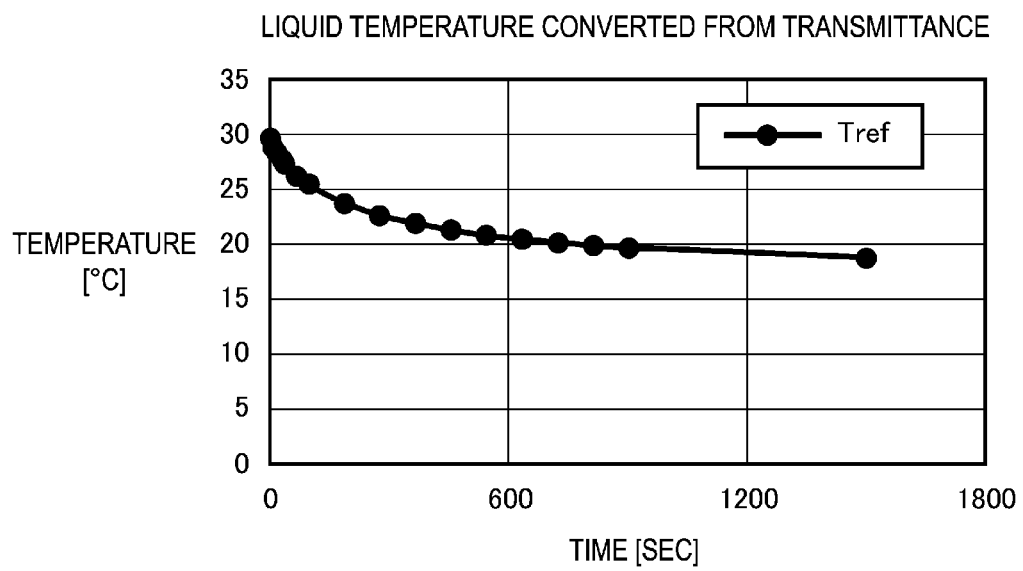
FIG. 5 is a figure illustrating an example in which the transmittance of the disinfectant having the known concentration is measured over time by the concentration measurement apparatus, and the transmittance is converted into a theoretical temperature based on the first correlation information and graphed.
Figure 5:
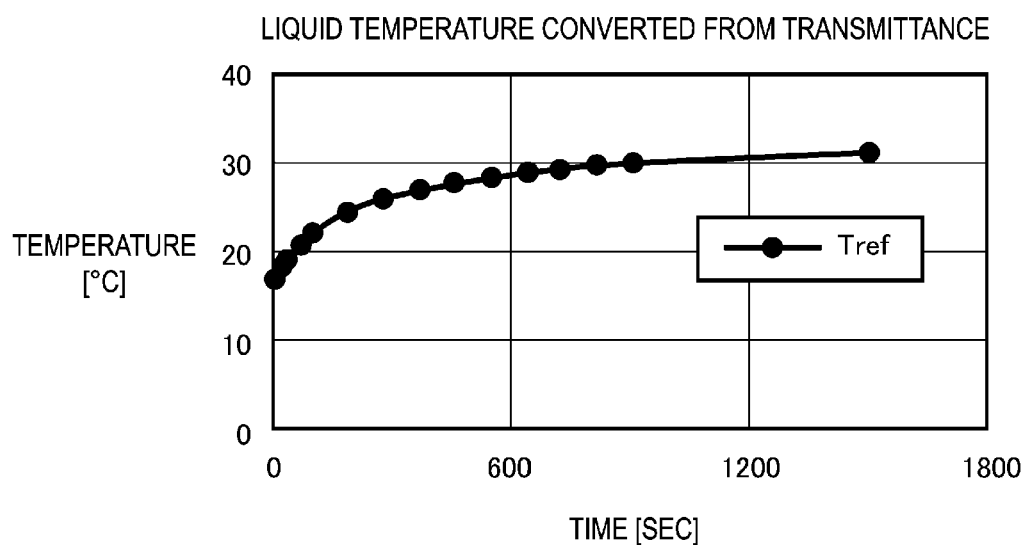

FIG. 5 illustrates an example in which the calculated theoretical temperature $T_{ref}$ is graphed. FIG. 5A illustrates a case where the liquid temperature is higher than the environmental temperature (a case where the liquid temperature gradually decreases due to thermal equilibrium), and FIG. 5B illustrates a case where the liquid temperature is lower than the environmental temperature (a case where the liquid temperature gradually increases due to thermal equilibrium).

The processing of Procedure 3 is also performed on an information processing apparatus (an apparatus different from the concentration measurement apparatus 1) such as a PC, but may be configured to be executed on the concentration measurement apparatus 1.

In Procedure 4, second difference information $T_{sub2}$, which is a difference between the theoretical temperature $T_{ref}$ calculated in Procedure 3 and the temperature $T_{object}$ of the calibration sample acquired by the sample temperature sensor 131, is calculated, and second correlation information between the second difference information $T_{sub2}$ and the first difference information $T_{sub1}$ acquired in Procedure 2 is acquired.

Figure 6:
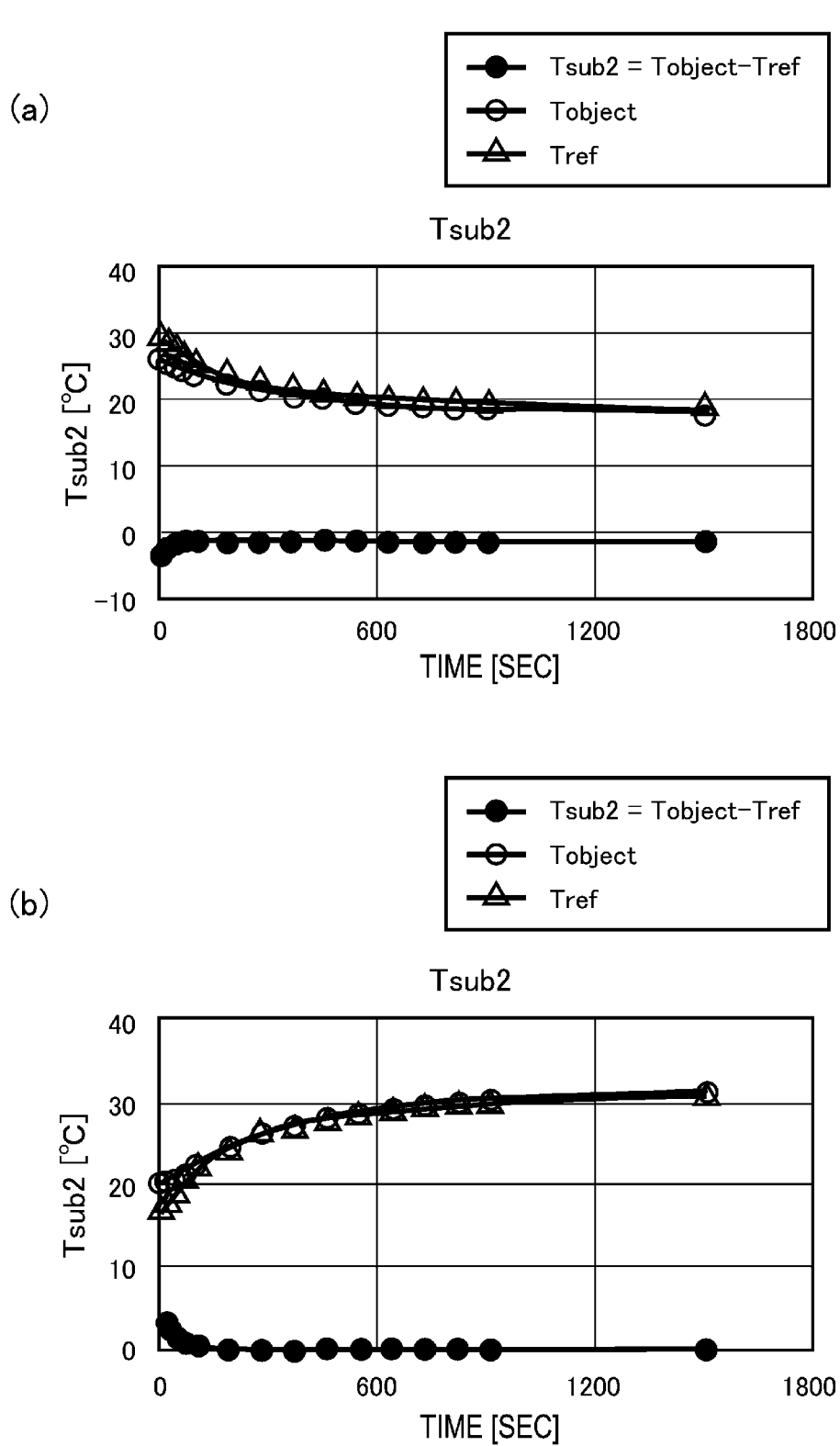
FIG. 6 is a figure illustrating an example in which $T_{sub2}$, which is the difference between the temperature of the disinfectant having the known concentration and the theoretical temperature, is graphed.

FIG. 6 is a graph illustrating the theoretical temperature $T_{ref}$ calculated in Procedure 3, the temperature $T_{object}$ of the calibration sample, and the second difference information $T_{sub2}$ which is a difference between these temperatures. FIG. 6A illustrates a case where the liquid temperature is higher than the environmental temperature, and FIG. 6B illustrates a case where the liquid temperature is lower than the environmental temperature.

Figure 7:
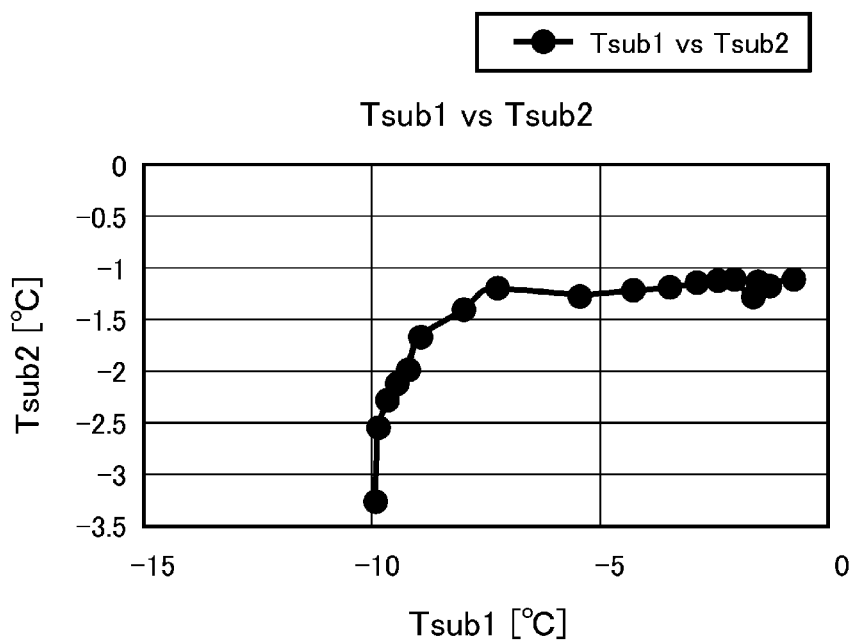
FIG. 7 is a graph illustrating an example of a correlation (second correlation information) between $T_{sub1}$ and $T_{sub2}$.
Figure 7:
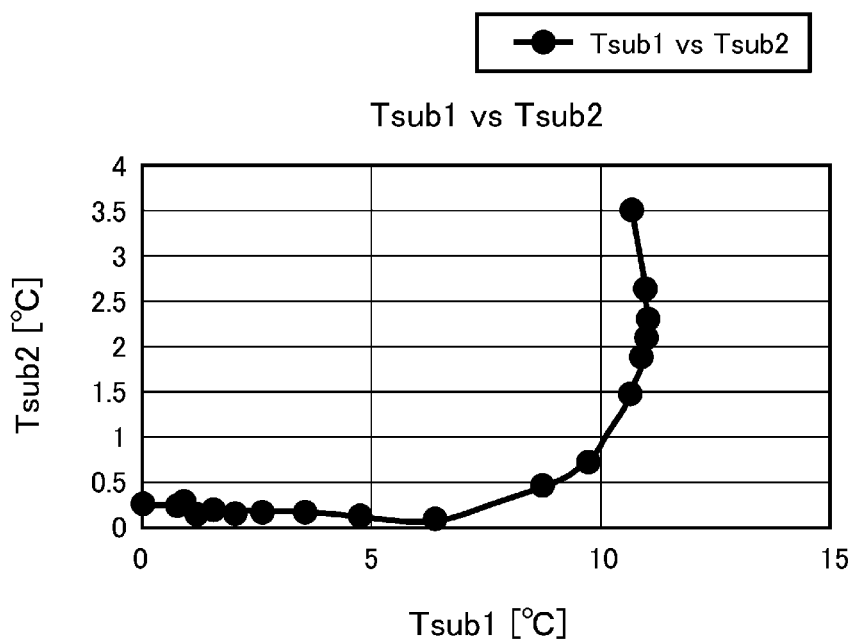

FIG. 7 is a graph (second correlation information) in which the Y-axis represents the second difference information $T_{sub2}$ and the X-axis represents the first difference information $T_{sub1}$. FIG. 7A illustrates a case where the liquid temperature is higher than the environmental temperature (negative second correlation information), and FIG. 7B illustrates a case where the liquid temperature is lower than the environmental temperature (positive second correlation information). Although the Y-axis represents the second difference information $T_{sub2}$ and the X-axis represents the first difference information $T_{sub1}$ in this example, the X-axis may represent the second difference information $T_{sub2}$ and the Y-axis may represent the first difference information $T_{sub1}$ (there is no conceptual difference therebetween).

In Procedure 5, an approximate expression of the graph of FIG. 7 (a function of the second difference information $T_{sub2}$ and the first difference information $T_{sub1}$) is determined.

In the present embodiment, exponential function approximation (calculation of coefficients $a_1$, $b_1$, and $c_1$) is performed based on Equation (4).

$$T_{sub2} = a_1 \cdot e^{b1 \cdot Tsub1} + c_1 \qquad \text{(Equation 4)}$$

Figure 8:
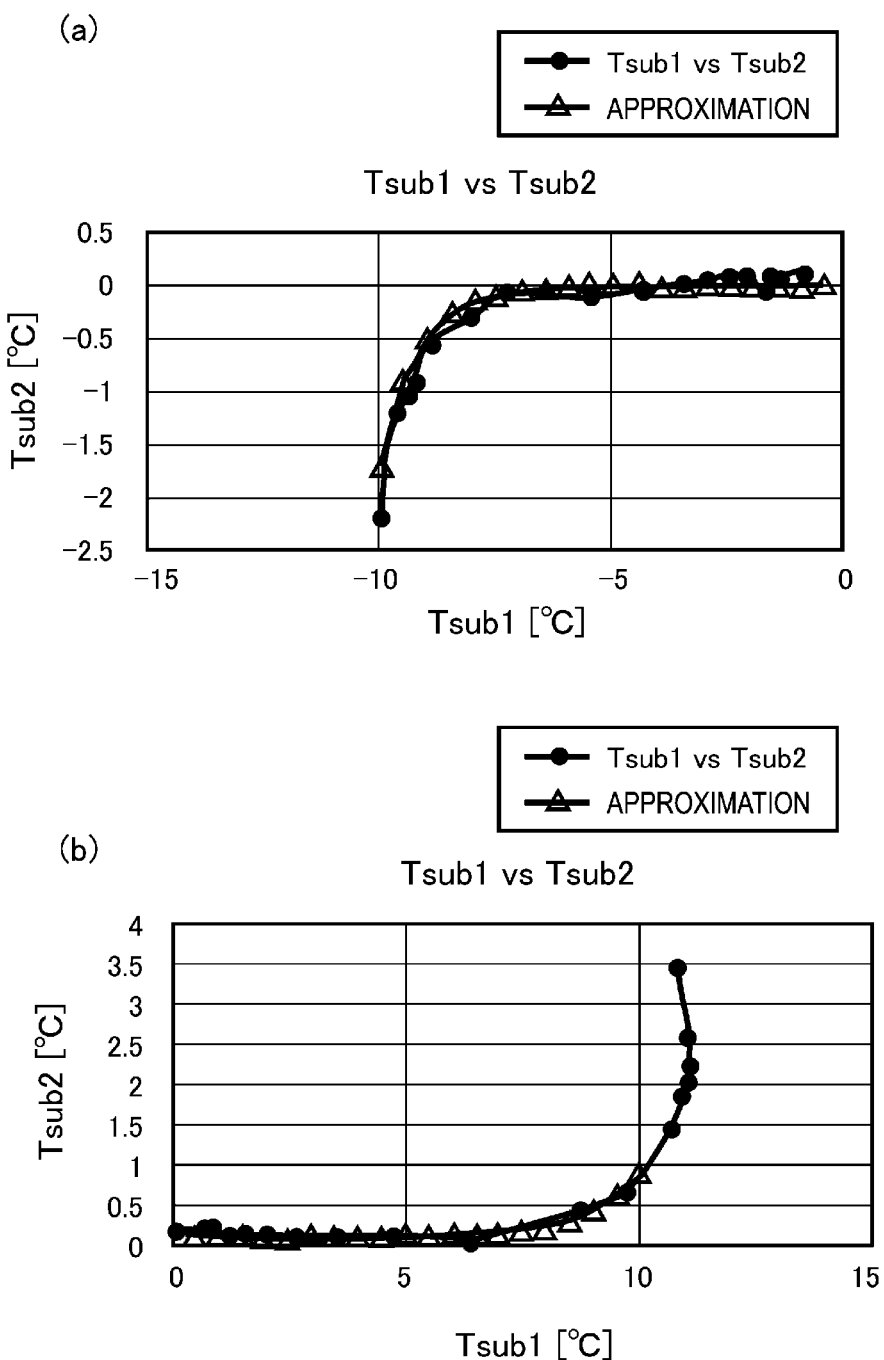
FIG. 8 is a graph obtained by further plotting an approximate expression (second correlation information) of the graph of FIG. 7.

FIG. 8 illustrates a graph of the obtained approximate expression. FIG. 8A illustrates a case where the liquid temperature is higher than the environmental temperature (negative second correlation information), and FIG. 8B illustrates a case where the liquid temperature is lower than the environmental temperature (positive second correlation information). That is, the coefficients $a_1$, $b_1$, and $c_1$ corresponding to the negative second correlation information and the coefficients $a_1$, $b_1$, and $c_1$ corresponding to the positive second correlation information are acquired.

Note that any of the information in the state of the graph in FIG. 8 (or the information therefor) and the information as the approximate expression obtained based thereon corresponds to the "second correlation information".

The processing of determining the second correlation information in Procedures 4 and 5 is also performed on an information processing apparatus (an apparatus different from the concentration measurement apparatus 1) such as a PC, but may be configured to be executed on the concentration measurement apparatus 1.

The above-described processing from Procedure 1 to Procedure 5 is performed on each concentration measurement apparatus 1 in the manufacturing factory, and parameters of the coefficients $a_1$, $b_1$, and $c_1$ (coefficients $a_1$, $b_1$, and $c_1$ corresponding to the negative second correlation information and coefficients $a_1$, $b_1$, and $c_1$ corresponding to the positive second correlation information) constituting the "second correlation information" corresponding to each concentration measurement apparatus 1 are set for each concentration measuring apparatus 1 (stored in the storage unit 12), so that the calibration processing (setting of parameters for temperature calibration) of the radiation temperature sensor 13 is performed.

The concentration measurement of the disinfectant using the concentration measurement apparatus 1 is performed by the processing from Procedure 6 to Procedure 8. Note that the concentration calculation processing (Procedure 8) itself can be performed using a related-art method as it is, and thus a description thereof will be omitted here, and the calibration of the measurement temperature of the disinfectant, which is necessary for the concentration calculation, will be mainly described.

The concentration measurement of the disinfectant (a sample having an unknown concentration) using the concentration measurement apparatus 1 is performed based on the measurement of the temperature of the disinfectant by the sample temperature sensor 131, the measurement of the environmental temperature by the environmental temperature sensor 132, and the measurement of the transmittance of the disinfectant by the light emitting unit 141 and the light receiving unit 142 in a state where the optical cell OC is set in the apparatus and the disinfectant is put therein.

In Procedure 6, it is determined whether a value obtained by subtracting the measurement value of the temperature of the disinfectant measured by the sample temperature sensor 131 from the measurement value of the environmental temperature measured by the environmental temperature sensor 132 is positive or negative.

As a result of the determination, if the value is negative, the processing of Procedures 7-1 and 8-1 is executed, and if positive, the processing of Procedures 7-2 and 8-2 is executed. Here, the processing for the negative value is performed in the case of 0, but the processing for the positive value may be performed in the case of 0.

In Procedure 7-1, the control/calculation unit 11 performs processing of calculating the temperature difference information ($T_{sub2}$), which is calibration temperature information, by substituting a value ($T_{sub1}$) obtained by subtracting the measurement value of the temperature of the disinfectant measured by the sample temperature sensor 131 from the measurement value of the environmental temperature measured by the environmental temperature sensor 132 into the approximate expression of Equation 4 (negative second correlation information corresponding to FIG. 8A).

Then, by using (adding) the temperature difference information ($T_{sub2}$), the control/calculation unit 11 performs processing of calibrating the measurement value of the temperature of the disinfectant measured by the sample temperature sensor 131.

In Procedure 8-1, the control/calculation unit 11 performs processing of calculating the concentration of the disinfectant using the temperature information of the disinfectant calibrated in Procedure 7-1 and the measurement value of the transmittance of the disinfectant.

The processing of Procedures 7-2 and 8-2 when the determination result of Procedure 6 is positive is the same as the processing of Procedures 7-1 and 8-1 except that the "positive second correlation information corresponding to FIG. 8B" is used instead of the "negative second correlation information corresponding to FIG. 8A". Thus, a description thereof will be omitted.

Figure 9:
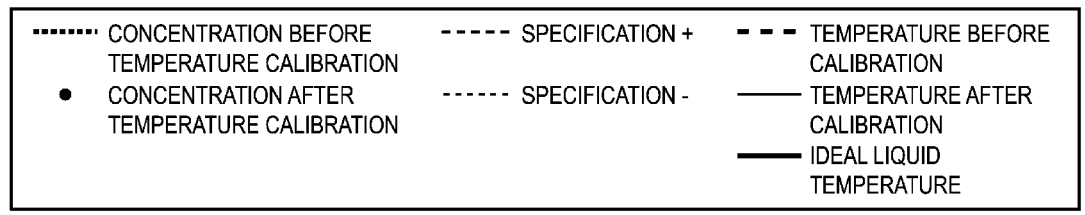
FIG. 9 is a graph illustrating a result of a verification experiment of the concentration measurement apparatus of the embodiment.
Figure 9:
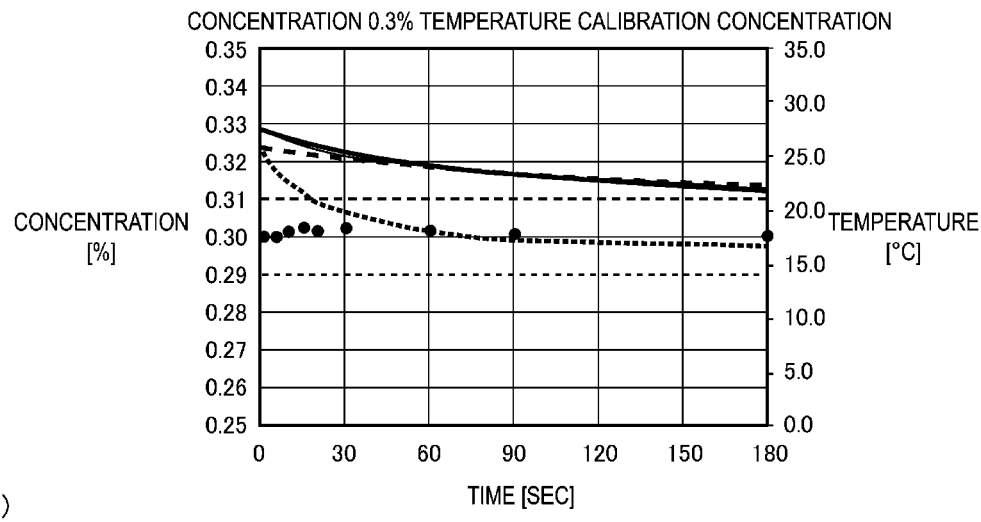
Figure 9:
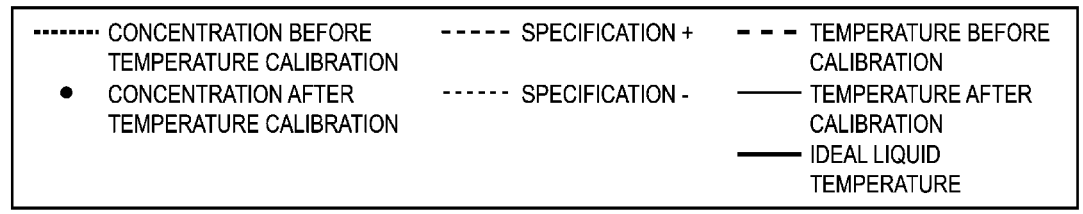
Figure 9:
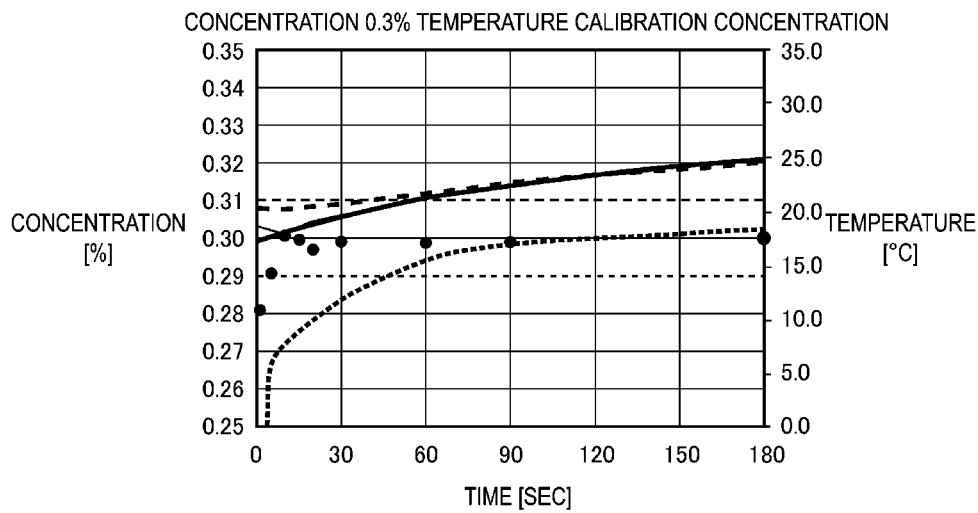

FIG. 9 illustrates a concentration measurement result (verification experiment result) of a disinfectant having a concentration of 0.3% using the concentration measurement apparatus 1.

In order to illustrate the effect of the temperature calibration by the concentration measurement apparatus 1, the concentration calculated at the temperature before the calibration (that is, using the measurement value of the sample temperature sensor 131 as it is) and the concentration calculated at the temperature after the calibration are illustrated. FIG. 9A illustrates a case where the liquid temperature is higher than the environmental temperature (the liquid temperature is set to about 25° C., and the environmental temperature is set to about 15° C. at the start of measurement), and FIG. 9B illustrates a case where the liquid temperature is lower than the environmental temperature (the liquid temperature is set to about 20° C., and the environmental temperature is set to about 30° C. at the start of measurement).

In the graph, the range of ±0.01 with respect to the concentration of 0.3%, which is within the specification, is indicated by a dotted line.

As illustrated in the figure, the concentration of the disinfectant, which originally has a concentration of 0.3%, based on the temperature before the calibration is outside the range of ±0.01 for the period of about 20 seconds from the start of measurement under conditions that the liquid temperature is set to about 25° C. and the environmental temperature is set to about 15° C. at the start of measurement, and for the period of about 45 seconds from the start of measurement under conditions that the liquid temperature is set to about 20° C. and the environmental temperature is set to about 30° C. at the start of measurement. That is, in the related art, it is necessary to perform measurement after waiting for at least the above-mentioned time (since it is not accurately known how long it is necessary to actually wait, a waiting time of at least 60 seconds or more is required in view of safety or the like).

On the other hand, in a case where the temperature calibration of the present embodiment is used, the concentration measurement value within the specification is obtained from the start of measurement when the liquid temperature is set to about 25° C. and the environmental temperature is set to about 15° C. at the start of measurement, and obtained about 5 seconds after the start of measurement when the liquid temperature is set to about 20° C. and the environmental temperature is set to about 30° C. at the start of measurement. Thus, the concentration measurement can be performed in a short time.

Immediately after the disinfectant is injected into the optical cell, the measurement value may not be stable due to the movement of the liquid, the generation of air bubbles, and the like caused by the injection (this also seems to have a large influence on the data deviation immediately after the start of FIG. 9B). Thus, a predetermined standby time (for example, about 10 to 15 seconds) until the liquid in the optical cell settles may be provided.

As described above, according to the concentration measurement apparatus 1 and the calibration method of the measurement temperature of the present embodiment, it is possible to accurately measure (calibrate) the temperature of the disinfectant even under the condition that there is a temperature difference between the environmental temperature and the liquid temperature of the disinfectant. Thus, it is possible to shorten or eliminate the conventionally required standby time until the environmental temperature and the liquid temperature of the disinfectant become the same, whereby the concentration measurement can be performed in a short time.

It is a challenge to accurately measure the temperature of the disinfectant when acquiring the calibration curve for the calibration; however, according to the present embodiment, this challenge is solved by obtaining the liquid temperature (theoretical temperature) based on the transmittance by utilizing the correlation between the temperature and the transmittance of the disinfectant. Accordingly, it is possible to obtain a correlation (that is, a calibration curve for calibration) between the apparent temperature (the wall surface temperature of the cell) of the disinfectant acquired by the sensor and a value (theoretical temperature) obtained by estimating the actual temperature of the disinfectant.

In the present embodiment, the positive second correlation information and the negative second correlation information corresponding to the positive and negative of the difference between the measurement value of the environmental temperature and the measurement value of the temperature of the sample at the time of measuring the concentration of the calibration sample are separately acquired.

This is because different tendencies are observed in the direction in which the liquid temperature decreases and in the direction in which the liquid temperature increases, and thus these directions are handled separately (in order to further increase the accuracy). It is conceivable that these tendencies are influenced by heat or the like generated by the concentration measurement apparatus which is an electronic apparatus. That is, it is conceivable that since heat generated by the light emitting unit and other electronic components during operation tends to apply a bias in the direction in which the liquid temperature increases, tendencies are different (not symmetrical) between the direction in which the liquid temperature decreases and the direction in which the liquid temperature increases.

Thus, in an apparatus having a configuration in which the influence of heat or the like of the electronic component can be ignored, calibration may be performed using only one piece of "second correlation information" without dividing the second correlation information into the positive second correlation information and the negative second correlation information.

In addition, by introducing a correction value for evaluating "a bias due to the influence of heat or the like of an electronic component", calibration may be performed using only one piece of "second correlation information" (the amount of the bias may be further calibrated using the correction value).

When there is no temperature difference between the environmental temperature and the liquid temperature of the disinfectant (that is, when $T_{sub1}$ of Procedure 6 is a value close to 0), the above-described calibration processing is not necessarily required. Thus, when $T_{sub1}$ of Procedure 6 is a value close to 0 (a predetermined value or less), the concentration calculation may be performed based on the measurement value of the sample temperature sensor 131 without performing the temperature calibration processing of Procedure 7.

Further, when (the absolute value of) the difference between the measurement value of the environmental temperature and the measurement value of the temperature of the sample at the time of measuring the concentration of the sample having the unknown concentration is greater than (the absolute value of) the maximum value of the difference between the measurement value of the environmental temperature and the measurement value of the temperature of the sample at the time of measuring the calibration sample (sample having the known concentration), error processing such as outputting error information to the output unit 16 may be performed.

The data is regarded as being out of the range of the calibration data and is handled as an error.

Instead of handling the data as an error, it may be possible to perform processing of waiting until the temperature difference between the environmental temperature and the liquid temperature of the disinfectant is made, by thermal equilibrium, equal to or less than the maximum value of the difference between the measurement value of the environmental temperature and the measurement value of the temperature of the sample at the time of measuring the calibration sample.

Figure 10:
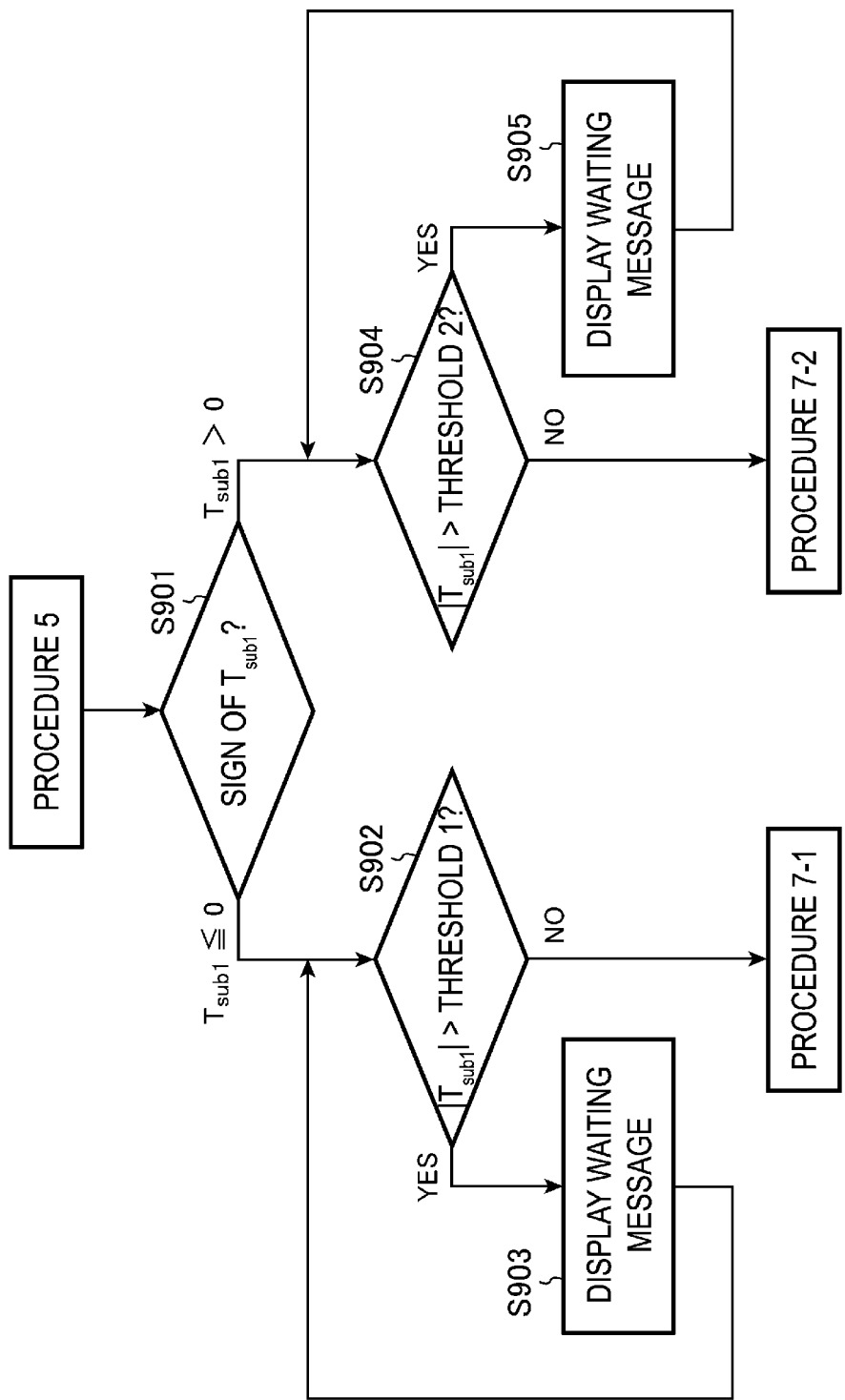
FIG. 10 is a flowchart illustrating another example of a part of a processing operation of the concentration measurement method (mainly the calibration method of the measurement temperature) of the embodiment.

FIG. 10 illustrates an example of this processing.

The processing of FIG. 10 is processing for substituting the part of Procedure 6 of FIG. 2. As a premise of this processing, the absolute values of the maximum values (positive and negative values) of $T_{sub1}$ acquired by the processing of Procedure 2 are set in the concentration measurement apparatus 1 (storage unit 12) as Threshold 1 and Threshold 2. For example, in the processing of Procedure 2, when the environmental temperature is 16° C. and the calibration sample temperature is 29° C., 13° C. is set as Threshold 1, and when the environmental temperature is 31° C. and the calibration sample temperature is 15° C., 16° C. is set as Threshold 2.

In step 901, it is determined whether the value ($T_{sub1}$) obtained by subtracting the measurement value of the temperature of the disinfectant measured by the sample temperature sensor 131 from the measurement value of the environmental temperature measured by the environmental temperature sensor 132 is positive or negative.

If the result of this determination is negative, the processing of steps 902 and 903 is executed, and if the result is positive, the processing of steps 904 and 905 is executed. Note that the processing for the negative value is performed in the case of 0, but the processing for the positive value may be performed in the case of 0. Further, as described above, in the case of 0, the temperature calibration processing may be skipped.

In step 902, it is determined whether the absolute value of $T_{sub1}$ exceeds Threshold 1. If the value exceeds Threshold 1, a message such as "waiting until the liquid temperature reaches the condition for measurement (or simply "measuring")" is displayed on the output unit 16 (step 903). The loop processing of steps 902 to 903 is performed until the absolute value of $T_{sub1}$ become equal to or less than Threshold 1.

If it is determined in step 902 that the absolute value of $T_{sub1}$ is equal to or less than Threshold 1, the processing proceeds to Procedure 7-1 in FIG. 2 to perform the calibration processing.

When the result of the determination in step 901 is positive, the processing of steps 904 and 905 is the same as the processing of steps 902 and 903 except that Threshold 2 is used instead of Threshold 1. Thus, a description thereof will be omitted.

In the embodiment, a disinfectant such as a glutaral aqueous solution or a phtharal aqueous solution is used as an example of a concentration measurement target. However, the present invention is not limited thereto, and the concept of the present invention can be applied to any sample having a correlation between a temperature, transmittance or absorbance, and concentration.

In the embodiment, a radiation temperature sensor, which is a non-contact temperature sensor, is used as an example of the temperature sensor, but the present invention is not limited thereto. For example, the concept of the present invention can be applied to a configuration in which the temperature of the optical cell is measured by any temperature sensor such as a contact-type temperature sensor.

In the example, the reference temperature sensor provided in the radiation temperature sensor is used as the environmental temperature sensor for measuring the environmental temperature, but the present invention is not limited thereto, and any temperature sensor capable of measuring the environmental temperature may be separately provided.

REFERENCE SIGNS LIST

1 . . . Concentration measurement apparatus
11 . . . Control/calculation unit (temperature calibration unit)
12 . . . Storage unit
13 . . . Radiation temperature sensor (sample temperature sensor, environmental temperature sensor)
141 . . . Light emitting unit (optical sensor)
142 . . . Light receiving unit (optical sensor)

The invention claimed is:

1. A calibration method of a measurement temperature of a concentration measurement apparatus performing, based on measurement of a temperature and a transmittance or an absorbance, concentration measurement on a sample having a correlation between a temperature, a transmittance or an absorbance, and a concentration, the calibration method comprising:
  acquiring first correlation information between a temperature and a transmittance or an absorbance based on a first sample, the first sample having a known concentration;
  measuring, over time, values related to the temperature, the transmittance or the absorbance, and an environmental temperature of the first sample by the concentration measurement apparatus, the concentration measurement apparatus including a sample temperature sensor, an optical sensor, and an environmental temperature sensor;
  acquiring second correlation information between first difference information and second difference information, the first difference information being a difference between a measurement value of the environmental temperature and a measurement value of the temperature of the first sample, the second difference information being a difference between:
    (1) a theoretical temperature, the theoretical temperature being based on the first correlation information with respect to a measurement value of the transmittance or the absorbance, and
    (2) the measurement value of the temperature of the first sample;
  in temperature measurement of a second sample during a concentration measurement of the second sample, the second sample having an unknown concentration, acquiring difference information between a measurement value of a temperature of the second sample measured by the sample temperature sensor and a measurement value of an environmental temperature measured by the environmental temperature sensor, and acquiring calibration temperature information based on the second correlation information with respect to the difference information associated with the second sample; and
  calibrating the measurement value of the temperature of the second sample by using the calibration temperature information.

2. The calibration method of the measurement temperature of the concentration measurement apparatus according to claim 1, wherein
  the acquiring of the second correlation information includes acquiring positive second correlation information and negative second correlation information respectively in a manner corresponding to a positive and a negative of a difference between the measurement value of the environmental temperature and the measurement value of the temperature of the first sample at a time of measuring the concentration of the first sample, and the calibration method includes acquiring the calibration temperature information based on either the positive second correlation information or the negative second correlation information in accordance with whether the difference between the measurement value of the environmental temperature and the measurement value of the temperature of the second sample at a time of measuring the second sample is positive or negative.

3. The calibration method of the measurement temperature of the concentration measurement apparatus according to claim 1, the calibration method comprising:

determining an error when an absolute value of a difference between the measurement value of the environmental temperature and the measurement value of the temperature of the second sample at a time of measuring the concentration of the second sample is greater than an absolute value of a maximum value of a difference between the measurement value of the environmental temperature and the measurement value of the temperature of the first sample at a time of measuring the first sample.

4. A concentration measurement apparatus performing, based on measurement of a temperature and a transmittance or an absorbance, concentration measurement on a sample having a correlation between a temperature, a transmittance or an absorbance, and a concentration, the sample including a calibration sample or a test sample, the concentration measurement apparatus comprising:

a sample temperature sensor configured to measure the temperature of the calibration sample or the test sample;

an optical sensor configured to measure the transmittance or the absorbance of the calibration sample or the test sample;

an environmental temperature sensor configured to measure an environmental temperature;

a storage unit configured to store second correlation information between first difference information and second difference information, the first difference information being a difference between a measurement value of the environmental temperature and a measurement value of a temperature of the calibration sample measured by the concentration measurement apparatus, the second difference information being a difference between a theoretical temperature and the measurement value of the temperature of the calibration sample, the theoretical temperature being based on first correlation information between:

(1) the measurement value of the temperature of the calibration sample, and (2) a measurement value of a transmittance or an absorbance of the calibration sample measured by the concentration measurement apparatus; and a temperature calibration unit configured to acquire difference information between a measurement value of the temperature of the test sample measured by the sample temperature sensor and a measurement value of the environmental temperature measured by the environmental temperature sensor, and calibrate the measurement value measured by the sample temperature sensor by using calibration temperature information based on the second correlation information with respect to the difference information.

5. The concentration measurement apparatus according to claim 4, wherein the second correlation information includes positive second correlation information and negative second correlation information corresponding to a positive and a negative of a difference between the measurement value of the environmental temperature and the measurement value of the temperature of the sample at a time of measuring a concentration of the calibration sample, and the calibration temperature information is acquired based on either the positive second correlation information or the negative second correlation information in accordance with whether the difference between the measurement value of the environmental temperature measured by the environmental temperature sensor and the measurement value of the temperature of the sample measured by the sample temperature sensor is positive or negative.

6. The concentration measurement apparatus according to claim 4, wherein error processing is performed when an absolute value of a difference between the measurement value of the environmental temperature measured by the environmental temperature sensor and the measurement value of the temperature of the sample measured by the sample temperature sensor exceeds a predetermined threshold.

7. The concentration measurement apparatus according to claim 4, wherein when an absolute value of a difference between the measurement value of the environmental temperature measured by the environmental temperature sensor and the measurement value of the temperature of the sample measured by the sample temperature sensor exceeds a predetermined threshold, processing of waiting until the absolute value becomes equal to or less than the threshold is performed.

* * * * *